United States Patent
Hintze, Jr.

[15] 3,701,238
[45] Oct. 31, 1972

[54] FENCE MOWER
[72] Inventor: George Hintze, Jr., 2411 Avenue "G", Nederland, Tex. 77627
[22] Filed: Aug. 28, 1970
[21] Appl. No.: 67,688

[52] U.S. Cl. .................56/10.4, 56/6, 56/13.6, 56/296
[51] Int. Cl. ...........................................A01d 35/08
[58] Field of Search..........56/10.4, 6, 13.6, 14.7, 296

[56] References Cited

UNITED STATES PATENTS

| | | | |
|---|---|---|---|
| 2,838,901 | 6/1958 | Davis | 56/10.4 |
| 2,575,369 | 11/1951 | Thornton-Trump | 56/10.4 |

Primary Examiner—Louis G. Mancene
Assistant Examiner—J. N. Eskovitz
Attorney—William E. Kinnear

[57] ABSTRACT

The invention has to do with utilizing a fence mower for mowing vegetation such as grass, weeds and the like in hard to reach places such as under and beyond fences supported by fence posts which vegetation is inaccessible to the conventional type mowers heretofore disclosed. The mower is operated by means of a lifting supporting arm attached to a wheeled tractor which supports and guides the mower durings operative and non-operative positions. The lower edge of the bottom portion of a sleeve and the upper spring held sleeve of a lower companion sleeve holds opposed cam faces on said sleeves in meshed position yieldingly, but upon the cutting element protruding through and under the fence coming into contact with a vertical fence post supporting the fence. The forward movement of the tractor will cause the blade cutting element under the fence contacting the post to turn backward 90° and thus allow the meshed cam faces of the lower companion spring held sleeve which is attached to the lower collar or housing which carries the blades to turn 90° and the matching cam face edges of the upper and lower sleeves to again releasably mesh and held only by tension of the spring will allow the cutting blade next under the fence to mow the vegetation under the fence forward thereof to the next succeeding fence post.

7 Claims, 2 Drawing Figures

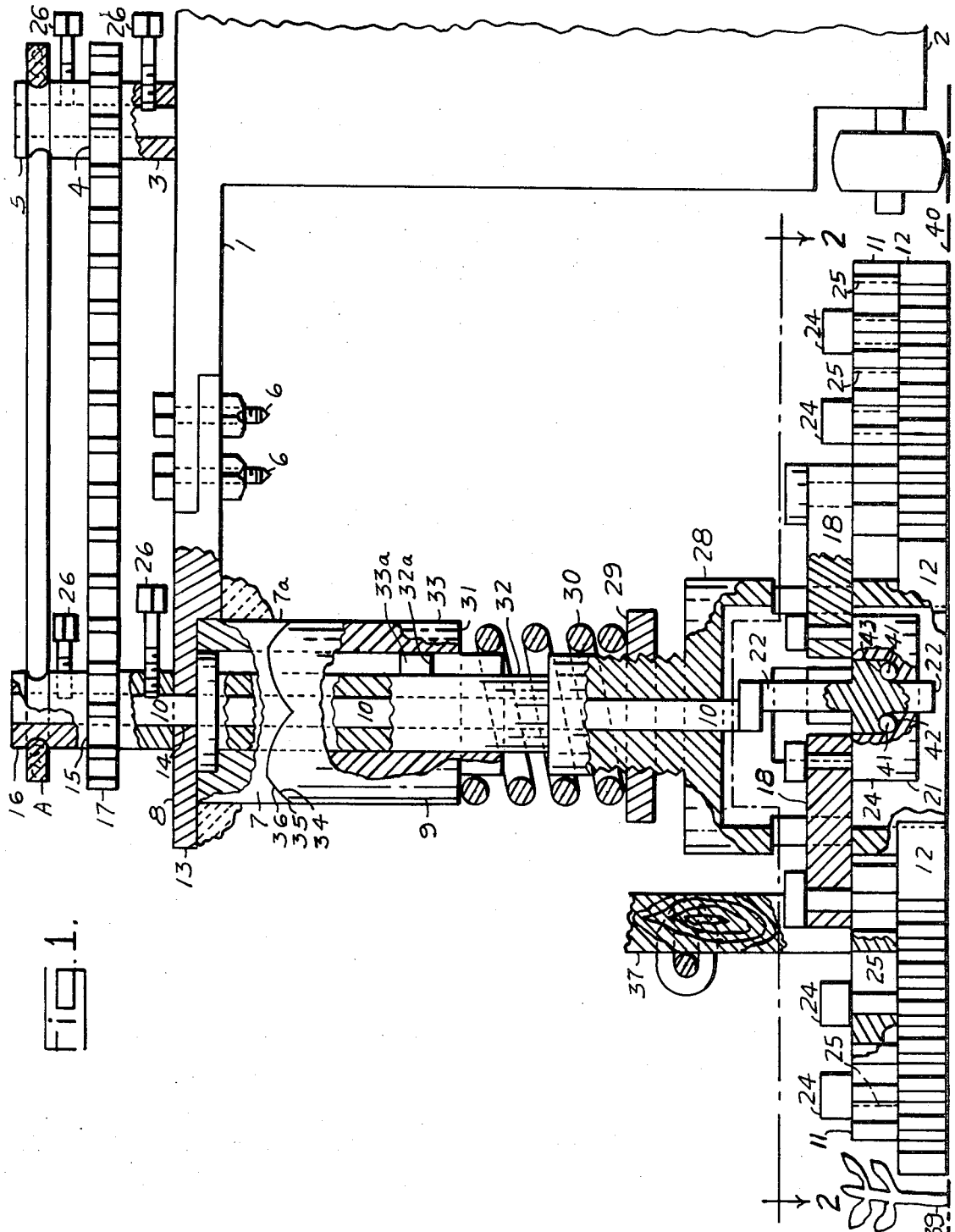

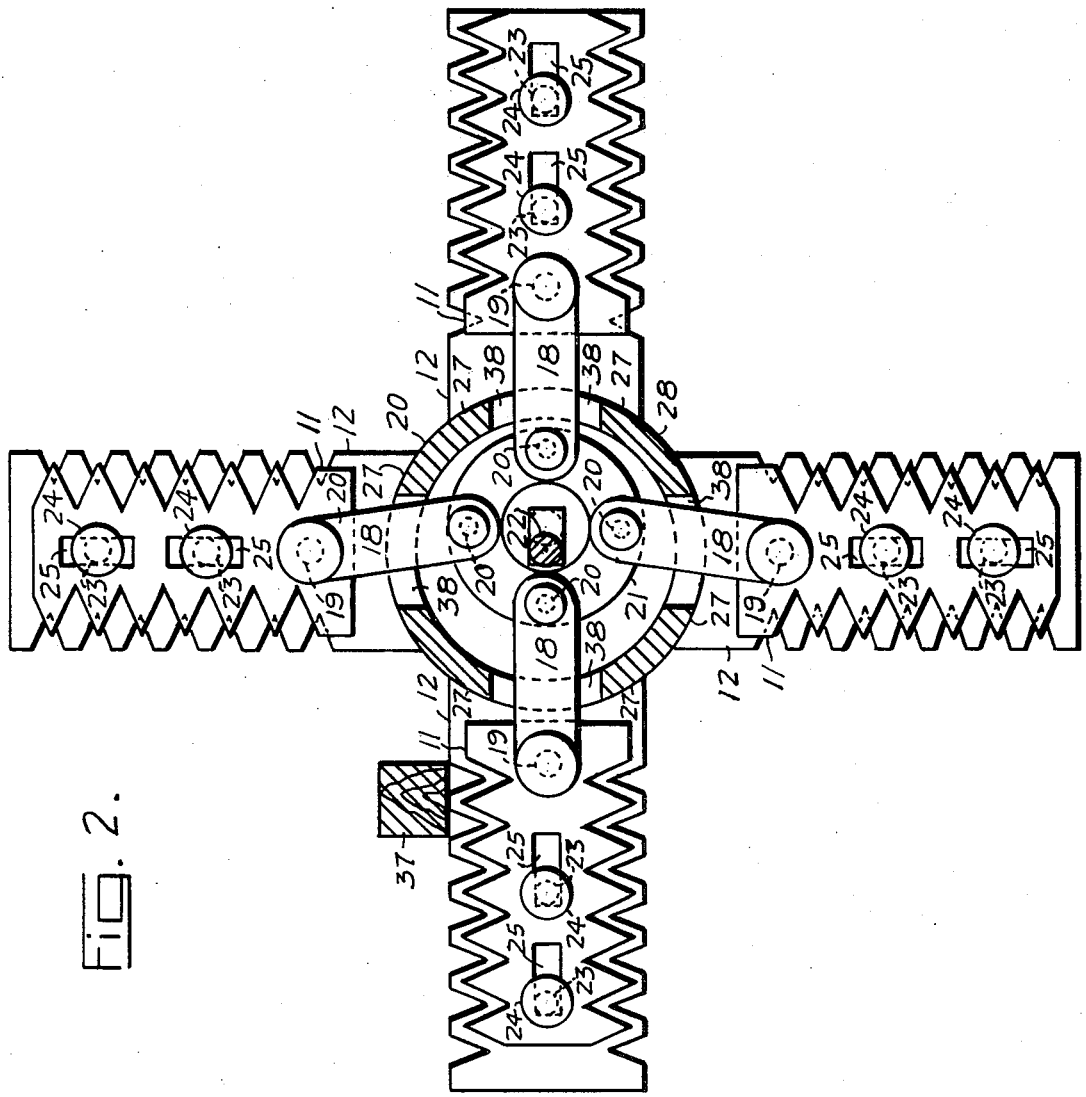

FENCE MOWER

The invention relates to an improved apparatus for cutting vegetation under and beyond fences that was heretofore inaccessible to any other type mower disclosed and is adapted for keeping mowed the unwanted and unsightly vegetation growing therebeneath to be neatly mowed.

An object of the invention is to provide a fence mower of the character described which has releasably multiple cutting blades one of which is adapted to be placed and to protrude through and under a fence for cutting the vegetation thereunder and beyond, and, upon said blade therebeneath contacting a post supporting the fence the forward movement of the tractor carrying the mower will cause said blade beneath the fence upon contacting the post to turn backward 90° and allow the next of the preferably four cutting blades similarly mounted to cut the vegetation between that post and the next successive post and the next ensuing blade and other sucessive blades to be turned backward 90° upon each contacting a post until the vegetation under said fence between and beyond said posts in a fenced area to be completely mowed.

Another object of the invention is to provide a fence mower of the character described whereby the tractor carrying and operating fence mower provides a power take-off drive shaft unit to turn and drive the drive shaft of the mower through endless belt or roller chain means and is provided with a supporting arm for placing and holding the cutting elements of the mower in operative position under a fence and for removing same from under the fence to inoperative position.

A further object of the invention is to provide a fence mower of the character described whereby the tractor supplies power to place a cutting element of said mower into operative position and to withdraw said mower into inoperative position under and beyond a fence and back between the posts supporting said fence and to supply the forward movement to feed the cutting elements of the mower forward to cut the vegetation under the fence alternately by each of the cutting elements in successive cadence upon each blade encountering the next successive post by the forward movement of the tractor and thereby turn said cutting element backward so that the next forward cutting blade element to turn into position under the fence forward of said last mentioned post in position for cutting the vegetation between said last mentioned post and next successive post forward thereof.

A still further object of the invention is to provide a mower of the character described whose lower portion is rotatable to the degree predetermined to cause the cutting elements supported and carried by the lower portion of the mower to alternatley and at spaced intervals yielding and releasably turn a predetermined number of degrees upon contacting a post supporting the fence under which one blade cutting element of a plurality of blade cutting elements when moved forward by the tractor feeding the blade cutting element forward to perform the cutting of the vegetation under the fence without injury to the posts so encountered, and, whereby the upper portion of the mower remains stationary while the lower portion thereof is actuated in its turning movement by the forward movement of the tractor causing the cutting blade under the fence to contact the next ensuing post and upon encountering same will force said blade to turn backward and thus placing the next ensuing blade in position under the fence for cutting the vegetation under the fence, and in like manner each succesive blade cutting element is operatied to perform in repetitive manner in being turned into position for cutting the vegetation under and beneath a fence.

These and other objects of the invention will in part be obvious and will in part be more fully disclosed in the specifications, one embodiment of which is illustrated in the accompanying drawings, in which:

FIG. 1 is a vertical side view in elevation and partly sectional showing the fence mower held and carried by the supporting arm from the tractor which tractor is shown in fragmentary view.

FIG. 2 is cross-section view taken on the line 2—2 of FIG. 1.

The invention will be better understood from a more detailed description thereof reference being had to the accompanying drawings wherein like numeraled parts therein denote like numeraled parts in the following description of the invention.

The numeral 1 denotes the supporting arm of the wheeled tractor 2. The tractor 2 has power take-off drive shaft 3 with toothed sprocket 4 below and pulley 5 mounted on said drive shaft 3 above the top of said supporting arm 1. Attached to the arm 1 by bolts and nuts 6—6 is the upper portion 7 of the mower generally indicated at 8. The fence mower 8 consists generally of the said upper portion 7 and the lower portion 9. A drive shaft 10 is disposed vertically through said upper portion 7 and said lower portion 9 and the lower end of said drive shaft 10 has offset to form eccentric crank adjacent its lower end to provide an eccentric crank which will upon turning of the drive shaft 10 cause the horizontally disposed reciprocating toothed upper blades 11 (four in number) to reciprocally slide along the top sides of the underlying stationary toothed blades 12 (four in number) in reciprocating motion so that the cutting edges of said upper reciprocating blades 11 will shuttle back and forth over the lower stationary blades 12 to cut the growing vegetation 39 on the ground indicated at 40 over with the blade combinations pass during their respective cutting operations.

The upper portion 7 of the mower which is attached to the supporting arm 1 by its head section 13 which has central hole 14 therethrough to accomodate the rotating drive shaft 10 that has toothed sprocket 15 and pulley 16 thereabove mounted adjacent the upper end of said drive shaft 10 in opposite relation to the respective offset toothed sprocket 4 and pulley 5 mounted on the power take-off drive shaft 3. An endless link roller chain 17 is threaded around said toothed sprockets 4 and 15 so that upon rotation of the power take-off drive shaft 4 of the tractor 2 the chain 17 will cause sprocket 15 to turn and impart rotation to drive shaft 10 of the mower to actuate pivoting links 18 (four in number) that are pivotally connected on inner ends of the upper reciprocating toothed blades 11 by headed pivot pins 19 (four in number) and the outer ends of said pivoting links 18 are connected by headed pivot pins 20 (four in number) at spaced intervals circumferrentially positioned on a disc 21. The disc 21 has central hole through which the throw or offset 22 of drive shaft 10 revolves. In each of the lower stationary blades 12 (four in number) are two holes 23—23 and headed bolts or rivets 24—24 extend therethrough and through 2 elongated slots 25—25 in each upper reciprocating blade 11.

The pulleys 5 and 16 have an endless belt A which surrounds and tightens around said pulleys 5 and 16 so that upon rotation of the power take-off drive shaft 3 by the motor of the tractor 2 will impart rotation to the drive shaft 10 of the mower as a double guarantee that the drive shaft 10 will receive rotative movement through the means of the power take-off drive shaft 3. However, the pulleys with belt, or, sprockets with chains may be used independently of each other. The toothed sprockets 4 and 15 and the pulleys 5 and 16 respectively are secured to their respective drive shafts by means of set screws or bolts 26.

The stationary cutting blades 12 are attached rigidly at 27 to collar or hollow housing 28 and being the terminating end of the lower portion 9 of the mower assembly. Said collar 28 has upper shoulder 29 against which the bottom end of the coil spring 30 bears. The upper end of said spring 30 is under constant tension and also bears against the lower shoulder 31 above the reduced portion 32 of sleeve 33 of the lower portion 9 of the mower assembly 8. The upper end of the sleeve 33 terminates in four upwardly facing cam faces 34, that having four high and four low cam faces 34 which mesh at 35 with the companion facing lower cam faces 36, that is, of four high and four low cam faces on the lower edges of the upper sleeve 37 of the upper portion 7 of the mower assembly. The coil spring 30 is under tension between the two opposing shoulders 29 and 31 so as to hold said opposed matching cam faces 34 and 36 yieldingly meshed into each other, thus allowing the sleeve 32 and the collar 28, links 18, upper blades 11, lower blades 12, drive shaft 10 and its throw or offset 22, circular disc 21 and its pivoting pins 22 to yieldingly turn 90° each time the particular blade 11 and 12 that protrudes under the fence encounter a fence post 37 during the operation of cutting vegetation under and beneath a fence.

The collar 28 has horizontal windows 38 (four in number as shown in FIG. 2 of the drawings to accommodate movable pivoting links 18 (four in number) and through which said links work in circular eccentric motion during each revolution of the throw or offset 22 of the drive shaft 10 to perform the cutting operation of the blades 11 and 12 in cutting the vegetation 39 growing from the ground indicated at 40. A row of ball bearings 41 are mounted in bearing recesses 42 and 43 as bearing supports for the offset 22 of drive shaft 10 of the mower assembly.

In the 90° turning of the lower portion 9 in the operation of the mower the whole lower portion 9 and its components parts connected thereto such as sleeve 33, reduced sleeve 32, collar 28, upper reciprocating blades 11, lower stationary blades 12 turn counter clockwise 90° upon the blade 11 and its respective blade 12 encountering post 37 so that the next forward successive blade 11 and its respective blade 12 are rotated 90° around the post 37 and remains under fence after having succeeded to the position of the former blade 11 and its respective blade 11 and 12 has turned backward 90°. During the counter clockwise 90° movement of said blades 11 and 12 as a set encounters a post by the forward movement of the tractor 2 forcing such action the meshed cam faces 34 of lower sleeve 33 will have turned and lowered a sufficient distance to force coil spring 30 to compress downward between shoulders 29 and 31 so that the high points (four in number) of cam faces 34 on sleeve 33 will disengage from the low points (four in number) and will mesh again upon 90° turn with the high points (four in number) and the low points (four in number) of the companion meshing cam faces 36 of sleeve 7a of the upper portion 7 of the mower assembly. During such 90° turning movements the spline 32a moves downward a sufficient distance in spline groove 33a to a position in spline groove 33a to allow the high points on the cam faces 34 and 36 to clear each other and the high points to mesh in the low points at point 35 each time a blade 11 and 12 contacts a post 37. This is accomplished since the lower sleeve 33 is spring held and will move downwardly and depress said spring 30 to allow sleeve 33 to revolve 90° after which its cam faces 34 will be raised upward by the spring 30 upon and during 90° turning of blades 11 and will mesh again in the stationary cam faces 36 of the upper stationary sleeve 7a caused by the forward movement of the tractor to allow the 90 degree rotating movement of lower portion 9 and its connected parts while upper portion 7 and its stationary parts remain in fixed stationary position. The upper supporting arm 1 is shown in FIG. 1 as being attached to left side of the tractor 2 and this arrangement positions the mower on the left side of said tractor 2 whereby said mower is moved to cut under a fence in a clockwise direction inside of a fenced area, but, upon placing the supporting arm 1 on the right side of the tractor 2 and attaching the fence mower thereto on the right side of the tractor the tractor when so arranged with the mower permits moving the tractor and mower in counterclockwise forward movement a fence and mow the grass or vegetation under the fence in forward counterclockwise movement inside the fenced area and the blades of the mower upon contacting a post while traveling counterclockwise inside a fenced area will turn backward 90° and next ensuing forward blade will cut the vegetation under the fence until it encounters a post and this same repetitive procedure is maintained as when the tractor and mower was arranged on the left side and the tractor and mower traveled clockwise inside the fenced area.

The fence mower is adapted for use in solving the problem of cutting vegetation growing under fences and the like which is inaccessible to any other type mower known. Heretofore the cutting of vegetation under fences was done by hand with hand tools. Further, a hazard is eliminated for uncut vegetation under fences becomes tinder for fires which destroy fences that have to be rebuilt at great expense.

It is understood that two, three, four or more cutting blades may be assembled on a collar and be employed with my fence mower, however, preferably four blades have been disclosed in one embodiment of the invention.

It is obvious that many changes in details of construction and arrangement of the parts of the invention may be made without departing from the spirit and scope of the invention.

What I claim as new and desire to secure by Letters Patent, is:

1. In a fence mower connected to a wheeled tractor by a supporting arm for placing and holding a plurality of blades of said mower alternately for cutting the vegetation beneath and beyond the fence and including a plurality of reciprocating blades, a centrally disposed drive shaft, an upper stationary portion and a lower revolvable portion, said drive shaft disposed through said upper and lower portions and rotatable therethrough, outer sleeves on both said upper and lower portions which are matched in end to end relation by a plurality of facing companion cam faced edges meshing said sleeves in releasably connected abutment, the lower revolvable portion turns a predetermined number of degrees with respect to the stationary upper portion upon a blade positioned beneath the fence contacting a post of the fence and the forward movement of the tractor feeding the blades forward will cause said blade so contacting said post to turn backward said predetermined degrees for placing said next ensuing blade of said plurality of blades to turn said same predetermined number of degrees to position said last named blade under said fence for cutting said vegetation under said fence.

2. Incorporating claim 1 and including a disc having central hole therethrough, said centrally disposed drive shaft terminating in an offset portion adjacent its lower end and rotatable through said hole in said disc to provide an eccentric operable rotatable crank to impart rotation to said disc to operate a plurality of reciprocating blades during the cutting operation of said blades.

3. Incorporating claim 2 and including said upper stationary portion terminating in a collar, a plurality of lower blades attached to said collar and extending outwardly therefrom, upper reciprocating blades operable in reciprocating movement over said lower blades to perform cutting operation of the vegetation.

4. Incorporating claim 3 and including link means having one end thereof pivotally attached to said disc at spaced intervals circumferentially around said disc and the other ends of said link means being pivotally connected at a common point on each of said upper reciprocating blades.

5. Incorporating claim 4 and including a drive shaft on said tractor coupled with power rotating means thereof to impart rotation to said drive shaft thereon and endless turning means surrounding pulley means on said drive shaft of said tractor an the drive shaft on said mower whereby rotation is imparted to said drive shaft on said mower for revolving the drive shaft on said mower to operate the blades of said mower to perform the cutting operation of the mower.

6. Incorporating claim 1 and including said supporting arm connecting said mower to said tractor and so positioned and arranged on said tractor that the mower is attached to the left side of the tractor to enable the operator of the tractor to move clockwise inside a fence surrounding a fenced area to permit the operator of said tractor to perform the cutting operation of the vegetation under and beyond said fenced area.

7. Incorporating claim 1 and including said supporting arm connecting said mower to said tractor and so positioned and arranged on said tractor that the mower is attached to the right side of the tractor to enable the operator of the tractor to move counterclockwise inside a fence surrounding a fenced area to permit the operator of said tractor to perform the cutting operation of the vegetation under and beyond said fenced area.

* * * * *